United States Patent

Messerly et al.

[11] 4,096,898
[45] Jun. 27, 1978

[54] INTERNAL TIRE LUBRICANT

[75] Inventors: James W. Messerly, Stow; James J. Shipman, Akron, both of Ohio

[73] Assignee: The B.F. Goodrich Company, Akron, Ohio

[21] Appl. No.: 656,450

[22] Filed: Feb. 9, 1976

[51] Int. Cl.² ............................................. B60C 17/00
[52] U.S. Cl. ................................ 152/330 L; 152/346; 252/59
[58] Field of Search ................... 152/330 L, 346, 347, 152/348; 252/59

[56] References Cited

U.S. PATENT DOCUMENTS

| 3,938,573 | 2/1976 | Hallenbeck | 152/347 |
| 3,952,787 | 4/1976 | Okado et al. | 152/347 |
| 3,987,833 | 10/1976 | Powell et al. | 152/347 |

Primary Examiner—Drayton E. Hoffman
Assistant Examiner—Donald W. Underwood
Attorney, Agent, or Firm—Harold S. Meyer; William A. Shira, Jr.

[57] ABSTRACT

An internal tire lubricant which minimizes or prevents injury to a pneumatic tire when it runs flat, and which also assists in sealing small punctures, consists of a mixture of liquid or easily fusible materials, one of which is a partially crystalline solid olefine polymer, and another of which is an essentially noncrystalline liquid or solid hydrocarbon or analogous material.

1 Claim, 2 Drawing Figures

INTERNAL TIRE LUBRICANT

CROSS REFERENCE TO RELATED APPLICATIONS

The invention of this application is an improvement on those of copending applications for patent, Ser. No. 370,656 filed June 18, 1973 by James W. Messerly, Joe A. Powell, and Ronald L. Shippy; and Ser. No. 594,845 filed July 9, 1975, a continuation of Ser. No. 410,695 filed Oct. 29, 1973 by James W. Messerly and Joe A. Powell and now abandoned.

BACKGROUND OF THE INVENTION

The applications for patent identified above describe the use of certain solid lubricants to perform either or both of two important functions. One such function is to seal punctures, particularly when the solid lubricants are present as coatings on a closed cell cellular rubber layer on the inside of the tire. The other function is to prevent destructive friction and thereby minimize or prevent injury to a tire in the event of loss of air and operation with the tire flat. The principal object of this invention is to provide a tire with an improved lubricant for performing either or both of the functions just mentioned.

SUMMARY OF THE INVENTION

We have discovered that a mixture of certain kinds of synthetic hydrocarbons, having molecular weights within a particular range and certain other specific physical properties, with other synthetic or natural hydrocarbon materials of a different particular kind, will have the exact properties necessary for effective functioning for the desired purposes when applied to the inner surface of pneumatic tires. The mixture is required to be a nonflowable but flexible solid at ordinary atmospheric temperatures but to be an extremely viscous liquid at normal operating temperatures of tires. It is required also to be permanently adherent to the rubber material at the inside surface of the tire and to be free from hardening such as would cause it to crack or flake off of the surface. In order to perform the function of sealing punctures, the composition should also be capable of swelling the material which is at the internal surface of the tire and which is usually made from a vulcanized composition consisting in large part of butyl rubber.

We have not found any single material which satisfactorily meets all of these requirements, but we have found that these requirements can all be met by preparing a blend of two or more different hydrocarbon materials, or materials which are chemically neutral and have the essential properties of hydrocarbons even though some atoms other than hydrogen and carbon may be present.

One of the materials must be a synthetic hydrocarbon polymer which is partially crystalline and which will melt at the temperature normally existing on the inner surface of a operating pneumatic passenger tire, but which is at least in part of such a character as to congeal as by partial crystallization to a soft, waxy solid at ordinary atmospheric temperatures. These properties are exhibited by hydrocarbon polymers of regular and essentially linear structure and moderate molecular weight in the range of about 1000 to 5000 and having melting or softening temperatures of about 75° to 110° C (165° to 230° F).

The other material which is mixed with the crystallizable polymer to produce the composition of this invention must be a material of sufficiently high molecular weight as not to flow noticeably at ordinary temperatures but which is essentially free from any tendency to crystallize at ordinary atmospheric temperatures and which permanently exhibits a tacky consistency permitting it to adhere and to remain in place on surfaces of other materials. It is preferably also a synthetic hydrocarbon polymer, but may be a suitable natural material of generally hydrocarbon character such as a heavy neutral petroleum oil. These properties are exhibited by materials consisting of molecules of generally high but quite variable molecular weight and irregular molecular structure. Thus the average molecular weights may be from about 1000 to 10,000 but the individual molecules may have molecular weights from a few hundred to over a hundred thousand. The molecular structure, too, is preferably rather irregular, and may include side chains, branches, and rings, and sometimes even some hetero atoms such as oxygen in hydroxyl or ether form.

We have discovered that neither of these two ingredients will perform satisfactorily by itself but that they will do so when mixed in suitable proportions.

The crystallizable or solid ingredient by itself will harden sufficiently to crack and flake off of the inner surface of the tire so that the handling of new tires in storage at normal low temperatures can cause loss of the material from the tires. A secondary consequence is extremely objectionable soiling of floors and handling equipment.

The noncrystallizable component by itself is not sufficiently solid to remain in the location to which it is applied. It can therefore flow to the bottom of a tire which has become heated in service and is then cooled in a stationary position, so that the concentration of material in one location will result in serious unbalance of the tire. Moreover, the noncrystallizable component is not sufficiently solid to be capable of functioning with reasonable reliability as a puncture sealant.

While neither of the ingredients alone is completely satisfactory, we have found that remarkably good performance is obtained when they are used in admixture in proper proportions. The proportions of the two ingredients required to obtain the desired results will necessarily vary somewhat with the choice of particular constituent materials.

The higher the molecular weight of the crystallizable ingredient, and the greater its crystallinity, the less of it will be required. Similarly, the molecular weight of the noncrystallizable ingredient will determine to some extent the proportion which can be used without causing excessive flow when the temperature of the tire is high. These two ingredients are obtainable in many different grades made from various raw materials in different ways.

They may each be made from olefins singly or mixed and polymerized in various ways using a variety of catalysts to produce polymers varying not only in molecular weight but also in molecular structure. Thus varying degrees of branching or cyclization may occur and, in addition, when made from olefin monomers which contain three or more carbon atoms a variety of molecular structures are possible such as atactic or syndiotactic or isotactic arrangements of the side chains, and with olefinic raw materials having more than three carbon atoms an even greater variety of structures is possible.

We have found that the suitability of materials for use in this invention is not dependent primarily on the particular base material from which each one is produced, but rather on fairly easily measured physical properties. We prefer to use mixtures of a partially crystallizable polyethylene with either atactic low molecular weight polypropylene or low molecular weight polyisobutylene, but polymers made from other olefins or mixtures of olefins may be used provided the requirements as to physical properties of the components are met, and the proportions are chosen so as to provide the required physical properties in the product.

The physical requirements for highway tires in passenger car sizes are essentially that the blend of hydrocarbon materials be free from brittleness at low winter temperatures, free from flow at temperatures somewhat above high summer temperatures, yet be semiliquid at normal operating temperatures of the tires, and be completely fusible at somewhat higher temperatures for convenient application in a molten condition. Preferably, the composition should remain flexible down to about $-35°$ C ($-30°$ F) and remain nonflowable up to $90°$ C ($195°$ F), although a narrower range from about $0°$ C ($32°$ F) at the low end may be satisfactory under some conditions, and to about $65°$ C ($150°$ F) at the high end may be satisfactory in a mild climate or under only moderately severe service conditions. In any event, the compositions should fuse to a liquid of a viscosity suitable for brushing or spraying at a temperature not over about $115°$ to $130°$ C ($240°$ to $265°$ F). In addition, the compositions should exhibit a distinct tack over all or at least the greater part of the range of service temperatures so that they will cling to the inner surface of the tire and remain in the position in which originally placed. These requirements are met by the compositions described below.

THE DRAWINGS

In the accompanying drawings.

DETAILED DESCRIPTION

The compositions which have been described in general terms are intended for use in conventional pneumatic tires, which may be bias carcass tires, or belted bias carcass tires, but are preferably radial carcass tires with the nearly inextensible belts which provide the essential lateral stability. They may be tires intended for almost any kind of service, but are preferably tires intended for highway passenger automobiles. Such tires are made with relatively thin walls, but operate at rather high speeds so that internal temperatures of $30°$ C ($54°$ F) above ambient temperatures are commonplace.

Figure 1:
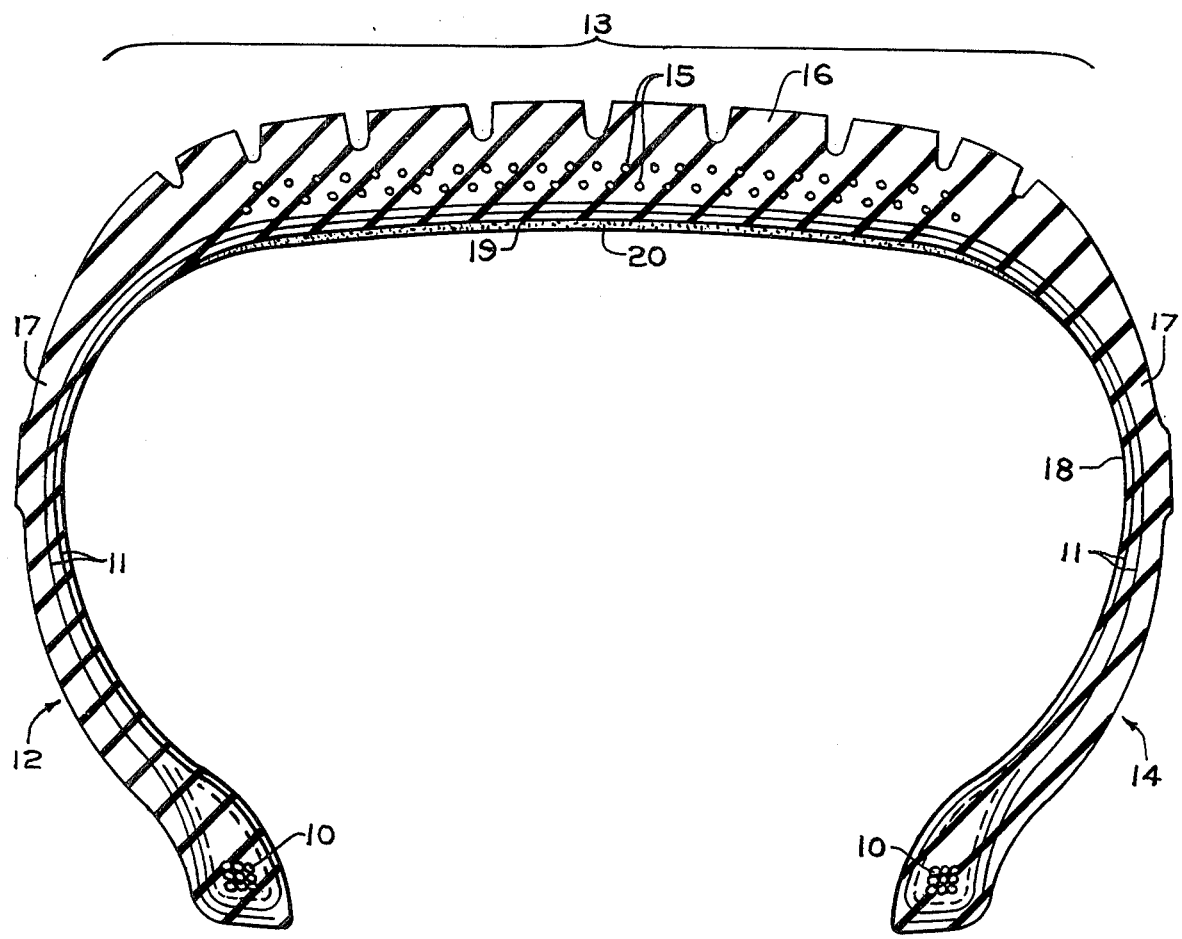
FIG. 1 is a sectional view of a pneumatic passenger car tire.
Figure 2:
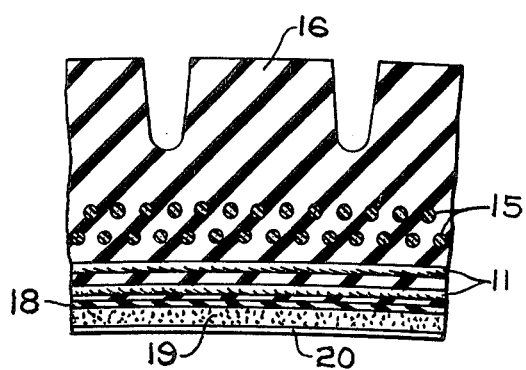
FIG. 2 is a partial section of the crown or tread portion of an enlarged scale.

In the drawings, FIG. 1 is a sectional view across a radial cord tire of low aspect ratio intended for passenger automobile service. Such a tire contains inextensible wire bead grommets 10 to hold the tire in place on the bead seats of a conventional flanged rim. One or two plies of rubberized inextensible cords 11 are provided to withstand the inflation pressure and have their margins wrapped around and vulcanized to the bead grommets 10. These plies 11 extend directly transverse of the tire and therefore lie in radial planes from one bead grommet 10 along the adjacent sidewall 12, across the crown region 13, along the other sidewall 14, and around the second bead grommet 10. To provide for lateral stability and to restrict the tread diameter so as to provide the desired low aspect ratio, a nearly inextensible belt outward of the carcass plies 11 is made up of strong cords 15 extending about the tire in a circumferential direction or at a small angle to the circumferential direction. Outward of the belt cords 15 is a thick layer 16 of tread rubber which extends across the entire crown 13 merging with a thinner rubber sidewall cover 17.

On the inside of the tire is a thin layer of essentially air-impervious material such as butyl rubber or chlorinated butyl rubber functioning as a liner 18 of about 1 to 3 mm (0.04 to 0.12 inches) thickness to prevent loss of inflation air by diffusion through the tire. Under the crown portion only of the tire is provided a layer of closed cell cellular rubber 19 of a thickness comparable to that of the liner or slightly greater, up to about 5 mm (0.20 inches), for the purpose of sealing punctures. The tire so far described, except for the presence of the cellular rubber 19, is a conventional tire. With the addition of the cellular rubber 19, it is the tire described in prior application, Ser. No. 370,656, cross referenced above.

In accordance with this invention, a composition is prepared from two commercially available materials. In a specific embodiment, one of them is a particular grade of polyethylene; the other is a particular grade of polypropylene.

The polypropylene is an amorphous noncrystallizable material made by polymerizing propylene with a redox catalyst to a moderate molecular weight of about 900. This polypropylene has a softening temperature of $82°$ to $95°$ C determined by the ball and ring laboratory method, and at $190°$ C is a liquid with a viscosity of 49 to 90 centipoises.

The polyethylene is a grade which is a soft solid of average molecular weight between about 1000 and 5000, a density of 0.88, and which becomes liquid at $85°$ C. It is mostly amorphous but contains a significant proportion of crystallizable material. It is sometimes called polyolefin grease.

In this particular example 100 parts of the polypropylene are melted with 30 to 50 parts and preferably about 35 parts of the partly crystalline polyethylene and intimately mixed.

The temperature is adjusted to about $120°$ C and the liquid mix is forced through a spray nozzle to produce a coarse spray of about $110°$ included angle directed to the inner surface of the crown portion of the tire, which requires a pressure of about 6 atmospheres. The amount applied should be sufficient to produce a coating of 1 to 2 mm thickness and preferably 1.5 mm, which requires in the neighborhood of 200 grams for a medium-sized passenger automobile tire.

The composition immediately solidifies to form a smooth, soft, greasy surface on the inside of the tire, which remains flexible and tacky over the entire normal range of operating temperatures so as to retain its position unchanged. A portion of the liquid material is absorbed by the underlying rubber surface which in the preferred form of the invention is the cellular rubber material. This action contributes to the firm retention of the coating in position and also somewhat swells the rubber material, which enhances the ability of the cellular rubber to seal small punctures.

As was pointed out in the prior application, Ser. No. 370,656, a thin cellular rubber layer on the inside of a tire is very effective in sealing small punctures, particularly when coated with low molecular weight polyethylene. The puncture sealing ability is even more effective with the mixed polymers of this invention.

Moreover, as pointed out in the other prior application, Ser. No. 410,695, an internal layer of low molecular weight polyethylene is an excellent internal lubricant for preventing destructive friction when a tire becomes deflated so that the weight of the vehicle is borne by small areas of the inner surface of the tire in moving apposition. This function is also more effectively performed by the mixed polymers of this invention.

Both of these benefits are obtained either with or without the presence of the cellular rubber layer.

In the absence of a cellular rubber layer, the polymer composition of this invention, because of its softness and plasticity, is readily smeared into a small puncture to reduce or prevent further escape of air, and if the temperature is so high as to cause the polymer composition to be semi-liquid, it tends to be absorbed rapidly by the surface of the rubber so as to swell the puncture shut. In the presence of a cellular layer the puncture closing actions are enhanced and made more certain by the expansion of the compressed gas in the closed cells toward the lower pressure of the outside atmosphere.

Again in the absence of a cellular rubber layer, the new polymer composition functions as a very effective lubricant during operation of a vehicle with a flat tire, eliminating or minimizing the rubbing forces which otherwise tend to tear or shred the inner surface of the flat tire. In the presence of a cellular rubber layer, which acts as a cushion to distribute radial forces which would otherwise be concentrated in a very small area and tend to cut the tire structure, the chances of injury during operation of a vehicle on a flat tire are still further reduced.

Similar excellent results are obtained with many other specific combinations of the kind outlined above.

Thus, with the partly crystalline, low molecular weight polyethylene described above, additions of the following materials have been found to give good results. For each 100 parts of the polyethylene:

a. 35 parts poly-isobutylene of average molecular weight about 890 and density 0.890.

b. 25 parts of the poly-isobutylene and 10 parts of paraffin base partly naphthenic petroleum oil of density 0.890 pour point $-10°$ C ($+14°$ F) and viscosity 100 secs SUS at 38° C (100° F).

c. 13 parts of the petroleum oil used in b. above and 20 parts of rosin oil of viscosity 95 to 130 secs SUS at 99° C (210° F).

Also, a mixture of 100 parts of a partly crystallizable polypropylene which becomes fluid at 95° C (200° F) with 40 parts of the same poly-isobutylene used in a. above gives similar good results both in sealing punctures and in protection against damage when run flat.

We claim:

1. A radial cord tubeless pneumatic tire having an essentially inextensible belt under the tread to restrict the circumference and produce a low aspect ratio, and having an air-impervious liner layer and a layer of closed cell cellular rubber the cells of which contain nitrogen gas under pressure covering at least a portion of the liner, and an internal coating consisting essentially of a mixture of:

(a) 100 parts of a soft solid partly-crystalline polyethylene of average molecular weight between about 1000 and 5000, a density of about 0.88, which becomes liquid at about 85° C, and (b) about 35 parts of an amorphous noncrystallizable polypropylene of molecular weight about 900 which has a softening temperature of about 82° to 95° C, the layer of closed cell cellular rubber and the internal coating extending across the entire inner surface of the crown region including the shoulder zones on which the weight of the vehicle rests when the tire goes flat.

* * * * *